United States Patent
Utter et al.

(10) Patent No.: US 6,950,011 B2
(45) Date of Patent: Sep. 27, 2005

(54) VEHICLE THEFT DETECTION DEVICE AND METHOD

(75) Inventors: Thomas E. Utter, Royal Oak, MI (US); David T. Proefke, Madison Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/368,175

(22) Filed: Feb. 18, 2003

(65) Prior Publication Data

US 2004/0160314 A1 Aug. 19, 2004

(51) Int. Cl.$^7$ ................................................ B60Q 1/00
(52) U.S. Cl. .............................. 340/425.5; 340/426.1; 340/438; 307/9.1
(58) Field of Search .......................... 340/425.5, 426.1, 340/508, 438, 426.11, 426.12, 426.32, 426.33; 307/9.1, 10.2

(56) References Cited

U.S. PATENT DOCUMENTS

| | | | | |
|---|---|---|---|---|
| 5,570,078 A | * | 10/1996 | Wayenberg | 340/426.32 |
| 5,606,306 A | * | 2/1997 | Mutoh et al. | 340/426.11 |
| 5,635,901 A | * | 6/1997 | Weinblatt | 340/426.12 |
| 5,763,958 A | * | 6/1998 | Yamamoto et al. | 307/10.5 |
| 5,963,128 A | * | 10/1999 | McClelland | 340/447 |
| 6,067,007 A | * | 5/2000 | Gioia | 340/426.19 |
| 6,133,855 A | * | 10/2000 | Kim | 340/932.2 |
| 6,144,113 A | * | 11/2000 | Hayashi et al. | 307/10.5 |
| 6,175,308 B1 | * | 1/2001 | Tallman et al. | 340/539.11 |
| 6,420,967 B1 | * | 7/2002 | Ghabra et al. | 340/447 |
| 6,549,116 B1 | * | 4/2003 | Honda et al. | 340/5.61 |

* cited by examiner

*Primary Examiner*—Phung T. Nguyen
(74) *Attorney, Agent, or Firm*—Laura C. Hargitt; Christopher DeVries

(57) ABSTRACT

A vehicle-motion based vehicle theft detection device uses preexisting vehicle motion sensors in combination with an engine immobilizer system to detect and deter potential vehicle theft. Depending on whether or not a valid ignition key is in use, the engine immobilizer system sends signals to an electronic module to enter either a "disarmed" or "armed" state. When a vehicle sensor relays a signal to an electronic module, the electronic module determines, based on this signal, if the vehicle is in motion. If a valid key is in use, the electronic module is in a disarmed state and takes no further action, as the motor vehicle is authorized for motion. If, however, a valid key is not in use, the electronic module is in an armed state, and activates the vehicle alarm system which, in turn, may activate an audible or visual alarm, activate a remote notification device, generate a tracking signal, and/or store evidence of unauthorized vehicle motion in memory.

15 Claims, 2 Drawing Sheets

VEHICLE THEFT DETECTION DEVICE AND METHOD

TECHNICAL FIELD

This invention relates generally to a theft detection device and method, and more specifically to a vehicle theft detection device and method utilizing vehicle motion sensing.

BACKGROUND OF THE INVENTION

Several different electronic vehicle theft deterrent devices and methods are available, typically belonging to one of two classes of devices—alarm systems and engine immobilizers. Vehicle alarm systems sense unauthorized entry into the motor vehicle and sound an audible alarm or, in the more advanced systems, activate a global positioning system (GPS) locating system. If, after the vehicle alarm system is armed, a door is opened or a window is broken without the system first being disarmed, the system is activated and responds with an audible alarm. Some vehicle alarm systems also incorporate a proximity sensor that activates the theft deterrent alarm if a person or persons is within some predetermined distance from the motor vehicle. The system will usually emit an audible warning that lets the person or persons know the motor vehicle is equipped with an alarm system, thus deterring a break-in before it can occur. Some advanced alarm systems also have shock sensors that will trigger the alarm system if someone tries to forcibly enter the motor vehicle.

Engine immobilizers utilize a coded method of identifying an authorized vehicle operator from an unauthorized vehicle operator. The most common implementation of an engine immobilizer is a vehicle ignition key which includes electronic coding in addition to the traditional mechanical coding. If, during an attempt to operate a motor vehicle, the received electronic code does not match one of the previously identified "valid" codes, engine operation is inhibited through control of one or a combination of starter, fuel system, and spark systems.

While the available systems are able to provide deterrence to theft, some thieves operate by moving the motor vehicle, usually by towing it, to an isolated location where the installed system or systems can be bypassed and parts can be stripped off the motor vehicle. To combat this, vehicle alarm systems are available today with a motion sensor that triggers the alarm system if the motor vehicle is moved when the system is armed. Motion-based alarm systems typically incorporate "tilt" switches that activate the motor vehicle alarm if the motor vehicle is tilted, such as when it is towed, or otherwise moved. Suspension displacement transducers are often used as well to sense unauthorized vehicle movement. However, these sensors are expensive additions to the motor vehicle and are limited to the effectiveness of the alarm system. Additionally, fraudulent claims of vehicle theft continue to comprise a significant percentage of all vehicle theft claims. Engine immobilizers make the possibility of theft without a valid ignition key extremely remote; however, the possibility remains that a vehicle equipped with an immobilizer could be towed or pushed away.

Accordingly, a need exists for a vehicle theft detection device and method that can provide a motor vehicle motion-sensitive deterrent system that is reliable and that uses inexpensive or preexisting sensors to keep the price of the system low.

SUMMARY OF THE INVENTION

A vehicle theft detection device is provided in accordance with the present invention. The vehicle theft detection device comprises a vehicle motion sensor, an authorized user detection mechanism, an unauthorized motion notification function, and a central control unit. The central control unit is coupled to receive a first signal from the vehicle motion sensor and a second signal from the authorized user detection mechanism and configured to send a third signal to the unauthorized motion notification function in response to receiving both the first signal and the second signal.

A method for motor vehicle theft detection is also provided in accordance with the present invention. The method for motor vehicle theft detection comprises the steps of receiving a first signal indicative of motion of a motor vehicle, receiving a second signal indicative that a valid ignition key is not in use, and activating a notification device in response to receiving both the first signal and the second signal.

BRIEF DESCRIPTION OF THE DRAWINGS

The inventive device and the method for its use will be understood after review of the following description considered together with the drawings in which.

DESCRIPTION OF THE PREFERRED EMBODIMENT

Figure 1:
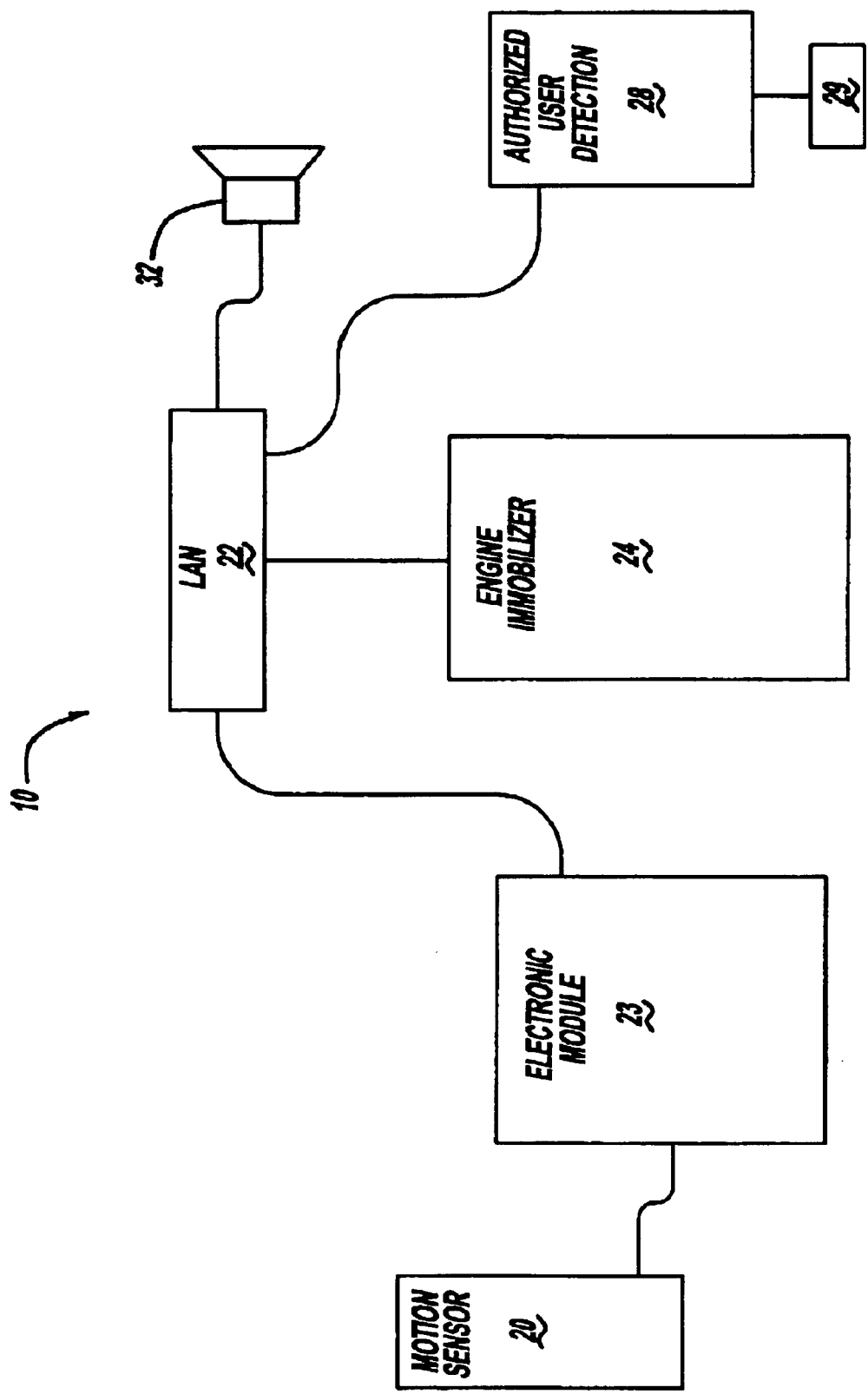
FIG. 1 schematically illustrates a vehicle theft detection device in accordance with one embodiment of the invention.

A vehicle theft detection device, in accordance with an embodiment of the invention, utilizes pre-existing vehicle-motion sensors in combination with an engine immobilizer system to detect and deter potential vehicle theft. FIG. 1 illustrates schematically such a vehicle theft detection device 10. Vehicle motion sensor 20 is configured to send communication signals regarding vehicle motion such as changes in vehicle position, vehicle speed, or wheel motion to an electronic module 23. These signals may be sent using radio frequency (RF) signals, through electrical leads, or the like. Electronic module 23 may be, for example, a portion of the central control unit of the motor vehicle, a stand-alone processor unit, or the like. Electronic module 23, in turn, is linked to an engine immobilizer system 24 by a local area network (LAN) 22 that allow the engine immobilizer system and the electronic module to each send and receive communication signals. Engine immobilizer system 24 may also be, for example, a portion of the central control unit of the motor vehicle, a stand-alone microprocessor, or the like. The engine immobilizer has the capability to inhibit operation of the vehicle by controlling, for example, one or a combination of starter, fuel system, spark system, transmission, or the like. Engine immobilizer system 24 and electronic module 23 are also coupled to an authorized user detection system 28 and to an unauthorized motion notification function 32 by LAN 22, allowing the engine immobilizer system and the authorized user detection system to communicate with each other, and allowing the electronic module 23 to turn the unauthorized motion notification function on and off in response to communications received from the engine immobilizer and the motion sensors. The engine immobilizer system determines whether a vehicle is authorized for motion based on signals from the authorized user detection system. Authorized user detection system 28 can be the conventional vehicle ignition system including an ignition key activated ignition switch and a key position sensor 29.

The ignition system can be configured to send encoded signals to the engine immobilizer system that are indicative of the presence in the ignition switch of an ignition key and the identity coded within that key. The coded identity information can be used by the engine immobilizer system to determine whether or not the key inserted in the ignition switch is a valid key and can be used to appropriately arm or disarm the vehicle theft detection device. For ease of description and to avoid unnecessarily describing known components of a motor vehicle, the authorized user detection system will hereafter be referred to simply as the key position sensor, although it is to be understood that the function of the authorized user detection system includes, for example, the functions normally associated with encoded ignition systems.

Unauthorized motion notification function 32 may perform a number of given tasks, including but not limited to emitting audible and visual alarms, activating a remote notification device, generating a tracking signal, or storing data logger contents. For convenience of description, the unauthorized motion notification function will hereafter be referred to as an alarm system, although, as described herein, the function may have responses more inclusive than simply sounding an alarm. The storing of data logger contents, for example in a solid state or other memory device, may aid in the apprehension of thieves, as the system stores a record of signals received, such as time and movement of the vehicle (if the system is equipped with a GPS system). The storing of data logger contents may also aid in refuting fraudulent theft claims by identifying lack of vehicle motion events.

Electronic module 23 functions as a central control unit for the vehicle theft detection device, receiving signals from the vehicle motion sensor, receiving an arming signal from the engine immobilizer system (which, in turn, receives signals from the authorized user detection system), and activating the unauthorized motion notification function in response to appropriate signals from both the vehicle motion sensor and the engine immobilizer system. The electronic module logically ANDs the signal from the vehicle motion sensor and the arming signal from the engine immobilizer system and sends an activating alert in response to the detection of vehicle motion when the system is armed.

Figure 2:
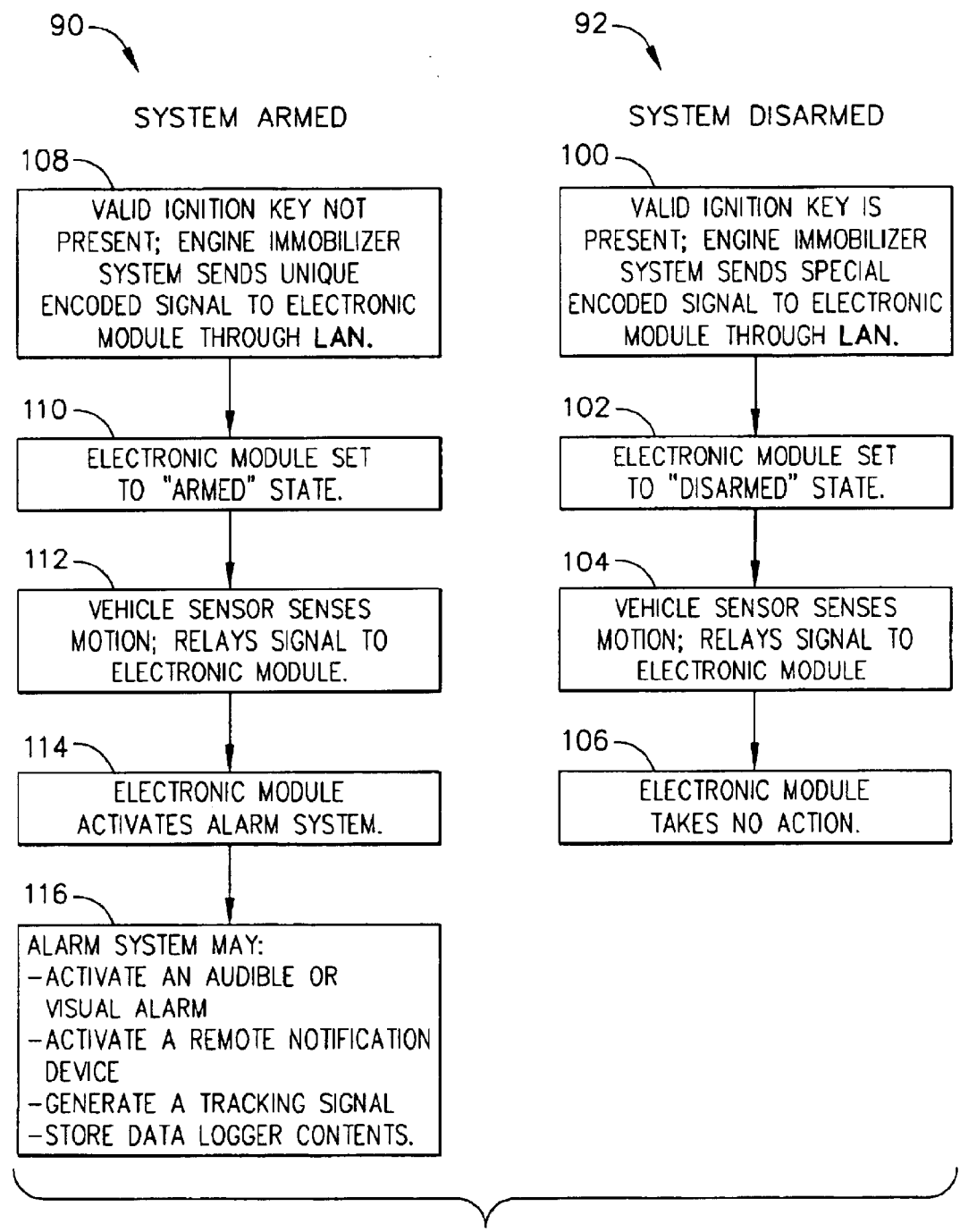
FIG. 2 illustrates, in a flow chart format, a method for vehicle theft detection in accordance with the invention.

A theft detection method in accordance with an embodiment of the invention under normal conditions is illustrated in flow chart form in FIG. 2 and will be understood by continued reference to FIG. 1. Electronic module 23 operates in either an "armed" state (path 90) or a "disarmed" state (path 92) depending on the signals it receives from engine immobilizer system 24 through LAN 22. The signals received from engine immobilizer 24 are in response to signals received from key position sensor 29 and authorized user detection system 28. As illustrated by path 92, when a valid ignition key is properly inserted into the ignition switch of the ignition system, making the motor vehicle authorized for motion, the engine immobilizer system receives a signal from the key position sensor identifying the key and, in turn, sends a specially encoded signal via LAN 22 to electronic module 23 (step 100). This specially encoded signal informs the electronic module that any motor vehicle motion is authorized and the signal sets the electronic module into a "disarmed" state (step 102). As long as the electronic module receives this specially encoded signal from the engine immobilizer, the electronic module remains in a disarmed state. If electronic module 23 senses, based on communication signals relayed from vehicle sensor 20, that motion is occurring, the electronic module takes no action due to being disarmed (step 106). As illustrated by path 90, when a valid ignition key is not present, however, as indicated by a signal received by the engine immobilizer from the key position sensor identifying the key in the ignition switch, engine immobilizer system 24 sends a different encoded signal to electronic module 23 through LAN 22 (step 108). This different encoded signal informs the electronic module that any vehicle motion is not authorized and the encoded signal from the engine immobilizer causes the electronic module to enter an "armed" state (step 110). As long as the electronic module receives this different encoded signal from the engine immobilizer, the electronic module remains in the armed state. Thereafter, if electronic module 23 senses, based on signals relayed from vehicle motion sensor 20, that motion is occurring, the electronic module communicates with alarm system 32 through LAN 22 activating the alarm system (step 114). Depending on how the alarm system is configured, it may then activate an audible or visual alarm, activate a remote notification device, generate a tracking signal, or store data logger contents (step 116).

In accordance with one embodiment of the invention, vehicle motion sensor 20 can be a wheel-speed sensor typically used to sense wheel rotation speed for anti-lock brake systems. Information regarding wheel speed is relayed to electronic module 23 by the wheel speed sensor. In accordance with a further embodiment of the invention, vehicle sensor 20 can be a wheel-mounted tire pressure-monitoring sensor. This sensor is typically of the centrifugal type that activates a roll switch when a wheel is rotating. If the roll switch is active, indicating motion by the vehicle, that information is communicated to electronic module 23 to indicate that motor vehicle motion is occurring. In accordance with yet another embodiment of the invention, the vehicle motion sensor can be a GPS based positioning sensor. If the vehicle position is detected to be changing, that information is communicated to electronic module 23 to indicate that motor vehicle motion is occurring. Each of these sensors is already present on many motor vehicle models and can be used, in accordance with the invention, in the vehicle theft detection device for monitoring vehicle motion without adding any additional cost to the vehicle.

Thus, it is apparent that there has been provided, in accordance with the invention, vehicle theft detection devices and methods that meet the needs set forth above. The device is reliable and is inexpensive compared with current motion-based systems because it relies on motion sensors, control units, and engine immobilizer systems already present in many of the current motor vehicles. The device also can optionally use data logging capabilities that may already be present in the motor vehicle. Although the invention has been described and illustrated with reference to specific embodiments thereof, it is not intended that the invention be limited to such illustrative embodiments. For example, the various components of the vehicle theft detection device described herein may communicate with each other in different manner than those illustrated. Additionally, by way of further example, although in the illustrative embodiment separate electronic module and engine immobilizer systems have been described, the two functions may be combined into one computing and communication device. Those of skill in the art will recognize that many variations and modification of such embodiments are possible without departing from the spirit of the invention. Accordingly, it is intended to be included with the invention all such variations and modifications as fall within the scope of the appended claims.

What is claimed is:

1. A vehicle theft detection device in a vehicle comprising:
   an engine in the vehicle;
   a vehicle motion sensor;
   an authorized user detection mechanism;
   an unauthorized motion notification function; and
   vehicle controller coupled to receive a first signal from the vehicle motion sensor and a second signal from the authorized user detection mechanism and configured to send a third signal to the unauthorized motion notification function in response to receiving both the first signal and the second signal;
   wherein the vehicle motion sensor comprises a wheel speed sensor that detects wheel rotation independent of engine speed; and
   wherein the vehicle controller does not send said third signal unless said engine is off.

2. The vehicle theft detection device of claim 1 wherein the wheel speed sensor comprising a portion of an anti-lock brake sensor.

3. The vehicle theft detection device of claim 1 wherein the authorized user detection system comprises an ignition switch and a key position sensor.

4. The vehicle theft detection device of claim 3 wherein the authorized user detection system comprises an engine immobilizer system coupled to the key position sensor.

5. The vehicle theft detection device of claim 4 wherein the key position sensor is configured to transmit encoded signals to the engine immobilizer system indicating the identity of a key inserted in the ignition switch and wherein the engine immobilizar is configured to determine from the encoded signals the presence or absence of a valid key in the ignition switch.

6. The vehicle theft detection device of claim 1 wherein the unauthorized motion notification function comprises a function selected from the group consisting of: audible alarm, visual alarm, remote notification device, tracking signal device, and data logger memory.

7. A vehicle theft detection device comprising:
   a vehicle motion sensor;
   an authorized user detection mechanism;
   an unauthorized motion notification function; and
   a vehicle controller coupled to receive a first signal from the vehicle motion sensor and a second signal from the authorized user detection mechanism and configured to send a third signal to the unauthorized motion notification function when an engine in the vehicle is in an off condition in response to receiving both the first signal and the second signal;
   wherein the vehicle motion sensor comprises a centrifugal roll switch.

8. A method for theft detection of a vehicle comprising the steps of:
   receiving a first signal indicative of motion of the vehicle from a wheel speed sensor that detects wheel rotation independent of an engine of the vehicle;
   receiving a second signal indicative that a valid ignition key for the vehicle is not in use; and
   activating an unauthorized motion notification function in response to receiving both the first signal and the second signal when the engine in the vehicle is in an off condition.

9. The method of claim 8 wherein the step of receiving a first signal further comprises the step of receiving a first signal from a sensor selected from the group consisting of, a wheel speed sensor, and a GPS based position detection system.

10. The method of claim 8 further comprising the step of recording a record of the receipt of both the first signal and the second signal in a vehicle controller embedded in a vehicle electrical system.

11. The method of claim 8 wherein the step of receiving a second signal comprises the steps of:
    transmitting a key identifying signal from a key position sensor;
    receiving the key identifying signal at an engine immobilizer system;
    generating an invalid key signal at the engine immobilizer system; and
    receiving the invalid key signal at a controller configured to receive the invalid key signal and the first signal.

12. A method for motor vehicle theft detection comprising the steps of:
    generating a first signal indicative of motion of a motor vehicle from a wheel speed sensor while an engine of the motor vehicle is off, said first signal Independent of engine speed;
    generating a second signal indicative that a valid ignition key is in use;
    generating a third signal indicative that a valid ignition key is not in use; and
    generating a fourth signal activating an alarm if the first and third signals are detected, but not if the first and second signals are detected.

13. The method of claim 12 further comprising the step of logging a record of detection of the first and third signals in a vehicle controller embedded in a vehicle.

14. A vehicle theft detection device in a vehicle comprising:
    an engine in the vehicle:
    a vehicle motion sensor selected from the group consisting of a tire pressure monitoring device capable of detecting wheel movement, a wheel speed sensor, and a GPS based position detection system; the vehicle motion sensor configured to transmit a first signal indicative of vehicle movement;
    a vehicle immobilizer system coupled to an authorized user detection system and configured to send a second signal if a valid ignition key is inserted in the authorized user detection system and to send a third signal if a valid ignition key is not inserted in the authorized user detection system;
    an alarm system configured for activation upon receipt of a fourth signal; and
    a controller configured to receive the first signal, the second signal, and the third signal and to generate and send the fourth signal upon receipt of the first signal and the third signal when the engine is off, but to not generate the fourth signal upon receipt of the first signal and the second signal; and
    wherein the controller comprises a portion of a motor vehicle central control unit.

15. The motor vehicle theft detection device of claim 14 further comprising a memory coupled to the controller and configured to record the receipt of the first signal and the third signal.

* * * * *